No. 730,622. PATENTED JUNE 9, 1903.
M. LE R. EDMUNDS.
BICYCLE BALANCE.
APPLICATION FILED FEB. 2, 1903.
NO MODEL.
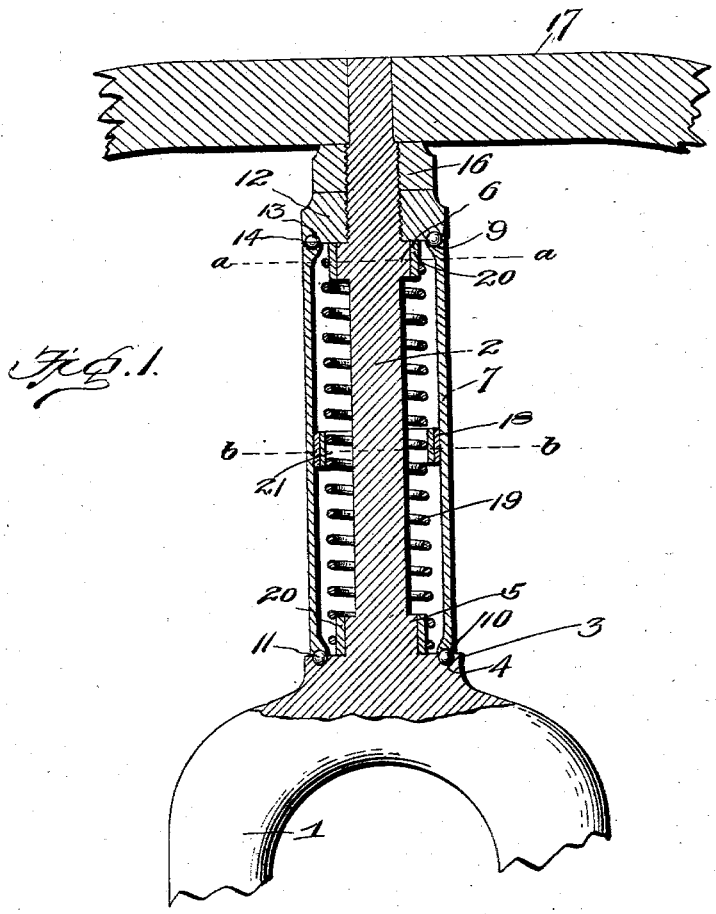
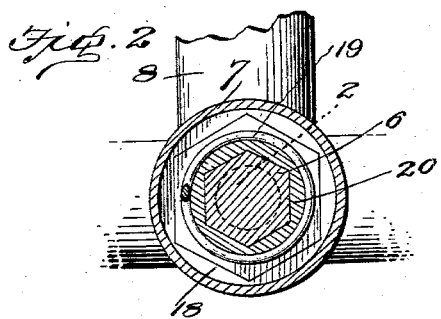
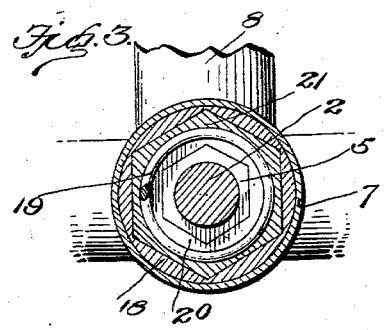
Inventor
M. L. Edmunds
Witnesses
By H. D. Wilson
Attorney No. 730,622.

Patented June 9, 1903.

UNITED STATES PATENT OFFICE.

MILTON LE ROY EDMUNDS, OF BANDON, OREGON.

BICYCLE-BALANCE.

SPECIFICATION forming part of Letters Patent No. 730,622, dated June 9, 1903.

Application filed February 2, 1903. Serial No. 141,554. (No model.)

*To all whom it may concern:*

Be it known that I, MILTON LE ROY EDMUNDS, a citizen of the United States, residing at Bandon, in the county of Coos and State of Oregon, have invented certain new and useful Improvements in Bicycle-Balances; and I do declare the following to be a full, clear, and exact description of the invention, such as will enable others skilled in the art to which it appertains to make and use the same.

My invention is an improved bicycle-balance; and it consists in the peculiar construction and combination of devices hereinafter fully described and claimed.

The object of my invention is to effect improvements in the construction of the steering-gear of a bicycle, whereby the same is caused to automatically turn the steering-wheel in line with the rear wheel when the rider has his hands off of the steering-arm and to thereby keep the bicycle directed in a certain course as against accidental deflections.

In the accompanying drawings, Figure 1 is a sectional view of the steering-gear of a bicycle provided with my improved balance. Fig. 2 is a sectional view of the same, taken on the plane indicated by the line $a\ a$ of Fig. 1; and Fig. 3 is a similar view taken on the plane indicated by the line $b\ b$ of Fig. 1.

In the embodiment of my invention here shown the steering or front wheel fork 1 is provided at its upper end with a stem 2, at the base of which is a circular enlargement 3, having a ball-race 4 on its upper side concentric with the said stem. The latter is provided at its lower end with an angular portion 5 and is also provided with a similar angular portion 6 at a suitable distance from its upper end.

The head-tube 7 of the bicycle-frame at the front end of the reach 8 has ball-races 9 10 at its upper and lower ends. Bearing-balls 11 operate in the races 4 10. At the upper end of the head-tube is a cap-nut 12, which is screwed to the fork-stem 2 and is provided on its under side with a race 13, in which and in the race 9 are bearing-balls 14. A nut 16 is screwed on the threaded upper portion of the fork-stem and bears on the upper side of the cap-nut 12, and to the extreme upper end of the fork-stem is attached the handle-bar or steering-bar 17, which may be of the usual or any suitable construction. On the inner side of the head-tube, at or near the center thereof, is a collar 18, which contracts the bore of the tube at that point, and the said collar is angular in form in order to provide the bore of the head-tube with a cross-sectionally angular portion.

On the stem 2 and within the head-tube is a balance-spring 19. The same is here shown as a coil-spring provided at its ends with angular collars 20 to engage the angular portions 5 6 of the stem to prevent the spring from rotating on the stem, and at the center of the spring, on its outer side, is an angular collar 21, which engages the angular portion 18 of the bore of the head-tube. The said spring is so adjusted with reference to the head-tube and the stem of the steering-fork as to normally cause the steering or front wheel carried by the steering-fork to be in line with the rear wheel to maintain the bicycle in a straight course when the hands of the rider are removed from the handle-bar. It is obvious that the spring permits the necessary turning of the fork to enable the operator to steer the bicycle in any desired course.

From the foregoing description, taken in connection with the accompanying drawings, the construction, mode of operation, and advantages of my invention will be readily apparent, it is thought, without requiring a more extended explanation.

Various changes in the form, proportion, and the minor details of construction may be resorted to without departing from the principle or sacrificing any of the advantages of the invention.

Having thus fully described my invention, what I claim as new, and desire to protect by Letters Patent, is—

In a bicycle, the combination of a steering-fork having a stem pivoted at its base and near its upper end with angular portions, a head-tube in which the stem is adapted to turn, and having an angular contraction in its bore at a point intermediate the angular portions of the stem, and a coil-spring in the head-tube and through which the steering-fork stem extends, said spring having angular collars at its ends engaging the angular portions of the stem, and having on its intermediate portion an angular collar engaging the angular contraction of the bore of the head-tube, substantially as described.

In testimony whereof I have hereunto set my hand in presence of two subscribing witnesses.

MILTON LE ROY EDMUNDS.

Witnesses:
WM. BATES,
W. D. MARSHALL.